(12) United States Patent
Makino et al.

(10) Patent No.: US 12,305,597 B2
(45) Date of Patent: May 20, 2025

(54) STEEL PIPE FOR FUEL INJECTION PIPE, AND FUEL INJECTION PIPE USING SAME

(71) Applicants: NIPPON STEEL CORPORATION, Tokyo (JP); USUI CO., LTD., Shizuoka (JP)

(72) Inventors: Taizo Makino, Tokyo (JP); Masahiro Yamazaki, Tokyo (JP); Tomohiko Omura, Tokyo (JP); Yuji Arai, Tokyo (JP); Osamu Endo, Shizuoka (JP); Naoki Serizawa, Shizuoka (JP); Tatsuya Masuda, Shizuoka (JP)

(73) Assignees: NIPPON STEEL CORPORATION, Tokyo (JP); USUI CO., LTD., Shizuoka (JP)

( * ) Notice: Subject to any disclaimer, the term of this patent is extended or adjusted under 35 U.S.C. 154(b) by 925 days.

(21) Appl. No.: 17/429,404

(22) PCT Filed: Feb. 13, 2020

(86) PCT No.: PCT/JP2020/005435
§ 371 (c)(1),
(2) Date: Aug. 9, 2021

(87) PCT Pub. No.: WO2020/166638
PCT Pub. Date: Aug. 20, 2020

(65) Prior Publication Data
US 2022/0136469 A1 May 5, 2022

(30) Foreign Application Priority Data
Feb. 13, 2019 (JP) ................................. 2019-023253

(51) Int. Cl.
*F02M 37/00* (2006.01)
*C21D 8/10* (2006.01)
(Continued)

(52) U.S. Cl.
CPC ......... *F02M 37/0017* (2013.01); *C21D 8/105* (2013.01); *C22C 38/002* (2013.01);
(Continued)

(58) Field of Classification Search
None
See application file for complete search history.

(56) References Cited

U.S. PATENT DOCUMENTS

| | | |
|---|---|---|
| 2009/0078341 A1 | 3/2009 | Asada et al. |
| 2010/0167086 A1 | 7/2010 | Usui et al. |
| 2016/0369759 A1 | 12/2016 | Masuda et al. |

FOREIGN PATENT DOCUMENTS

| | | |
|---|---|---|
| JP | 09057329 A | 3/1997 |
| WO | 2007119734 A1 | 10/2007 |

(Continued)

OTHER PUBLICATIONS

Eisuke Nakayama, et al. "Prediction of Fatigue Strength of Spot-Welded Joints Based on Local Material Strength Properties Measured by Small Specimen"; J. Soc, Mat. Sci., Japan, vol. 53, No. 10, pp. 1136-1142; Oct. 2004.

(Continued)

*Primary Examiner* — Brian D Walck
(74) *Attorney, Agent, or Firm* — Greer, Burns & Crain, Ltd.

(57) ABSTRACT

A steel pipe for a fuel injection pipe has a chemical composition consisting of, by mass %: C: 0.17 to 0.27%, Si: 0.05 to 0.40%, Mn: 0.30 to 2.00%, P: 0.020% or less, S: 0.0100% or less, O: 0.0040% or less, Ca: 0.0010% or less, Al: 0.005 to 0.060%, N: 0.0020 to 0.0080%, Ti: 0.005 to 0.015%, Nb: 0.015 to 0.045%, Cr: 0 to 1.00%, Mo: 0 to 1.00%, Cu: 0 to 0.50%, Ni: 0 to 0.50%, V: 0 to 0.15%, and the balance: Fe and impurities. The metal micro-structure consists substantially of tempered martensite, or tempered martensite and (Continued)

tempered bainite. The hardness is within the range of 350 to 460 HV1. A lattice spacing of a (211) diffraction plane measured by CoKα characteristic X-ray diffraction is 1.1716 Å or less, and a half-value width of the (211) diffraction plane is 1.200° or less. The number density of cementite having a diameter of 50 nm or more is $20/\mu m^2$ or less.

4 Claims, 1 Drawing Sheet

(51) Int. Cl.
| | |
|---|---|
| C22C 38/00 | (2006.01) |
| C22C 38/02 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/58 | (2006.01) |

(52) U.S. Cl.
CPC .............. *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *C21D 2211/002* (2013.01); *C21D 2211/008* (2013.01); *F02M 2200/9061* (2013.01)

(56) References Cited

FOREIGN PATENT DOCUMENTS

| | | |
|---|---|---|
| WO | 2009008281 A1 | 1/2009 |
| WO | 2015129617 A1 | 9/2015 |

OTHER PUBLICATIONS

Tatsuro Kunitake, "Heat Treatment"; 41 (2001), p. 164.

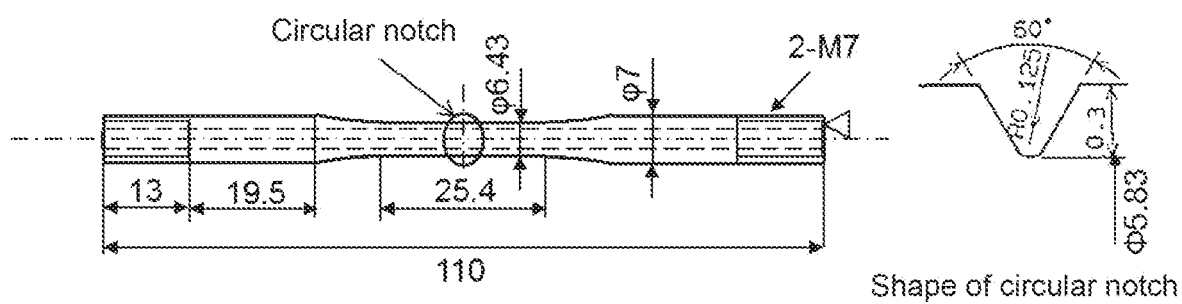

STEEL PIPE FOR FUEL INJECTION PIPE, AND FUEL INJECTION PIPE USING SAME

This is a National Phase Application filed under 35 U.S.C. § 371, of International Application No. PCT/JP2020/005435, filed Feb. 13, 2020, the contents of which are incorporated by reference.

TECHNICAL FIELD

The present invention relates to a steel pipe for a fuel injection pipe, and a fuel injection pipe that uses the steel pipe for a fuel injection pipe.

BACKGROUND ART

Movements for promoting energy saving and movements for recycling resources as measures to deal with the future depletion of energy resources are extremely active, and intensive activity is also taking place with respect to the development of technologies to achieve the goals of these movements. In particular, in recent years, there have been strong demands for the reduction of $CO_2$ emissions which accompany combustion of fuel to prevent global warming as a worldwide effort.

Examples of internal combustion engines with low $CO_2$ emissions include diesel engines that are used in automobiles and the like. However, although the $CO_2$ emissions of diesel engines are low, diesel engines suffer from the problem of generating black smoke. Black smoke occurs when there is not enough oxygen for the fuel that is injected. In other words, a dehydrogenation reaction occurs due to partial thermal decomposition of the fuel, which produces a precursor to black smoke, and the precursor thermally decomposes again, and agglomerates and coalesces to thereby produce black smoke. The black smoke produced in this way causes air pollution, and there is a concern that such black smoke adversely affects the human body.

The amount of black smoke that is generated can be reduced by increasing the injection pressure of fuel to the combustion chamber of the diesel engine. However, for this purpose, the steel pipe that is used for fuel injection is required to have high fatigue strength. The following technologies have been disclosed with regard to such a fuel injection pipe or a steel pipe for use in a fuel injection pipe.

Patent Document 1 discloses a method for producing a steel pipe to be used for fuel injection in a diesel engine, in which the inner surface of a seamless pipe starting material that was subjected to hot rolling is subjected to grinding and polishing by shotblasting treatment, and thereafter a cold drawing process is performed thereon. Patent Document 1 describes that by employing this production method it is possible to make the depths of flaws (unevenness, fracture, fine cracks or the like) on the inner surface of the steel pipe 0.10 mm or less, and therefore the strength of a steel pipe to be used for fuel injection is increased.

Patent Document 2 discloses a steel pipe for a fuel injection pipe in which the maximum diameter of nonmetallic inclusions which are present up to a depth of at least 20 μm from the inner surface of the steel pipe is 20 μm or less, and which has a tensile strength of 500 MPa or more.

Patent Document 3 discloses a steel pipe for a fuel injection pipe having a tensile strength of 900 N/mm$^2$ or more, in which the maximum diameter of nonmetallic inclusions which are present up to a depth of at least 20 μm from the inner surface of the steel pipe is 20 μm or less.

The invention of Patent Document 3 achieves a tensile strength of 900 MPa or more by producing a material pipe using steel materials from which A type, B type, and C type coarse inclusions have been removed by reducing the S (sulfur) content, devising a suitable casting method, reducing the Ca (calcium) content and the like, adjusting the diameter of the material pipe to an intended diameter by cold rolling, and thereafter performing quenching and tempering. In examples, critical internal pressures in the range of 260 to 285 MPa are achieved.

Patent Document 4 discloses a steel pipe for a fuel injection pipe which has a tensile strength of 800 MPa or more, preferably 900 MPa or more, and which is excellent in internal pressure fatigue resistance, and also discloses a fuel injection pipe that uses the steel pipe.

LIST OF PRIOR ART DOCUMENTS

Patent Documents

Patent Document 1: JP9-57329A
Patent Document 2: WO 2007/119734
Patent Document 3: WO 2009/008281
Patent Document 4: WO 2015/129617

Non Patent Documents

Non-Patent Document 1: Eisuke Nakayama, Mitsuo Miyahara, Kazuo Okamura, Hiroki Fujimoto, and Kiyoyuki Fukui, "Prediction of Fatigue Strength of Spot-Welded Joints Based on Local Material Strength Properties Measured by Small Specimen", J. Soc, Mat. Sci., Japan, Vol. 53, No. 10, pp. 1136-1142, October 2004.
Non-Patent Document 2: Tatsuro Kunitake, Heat Treatment, 41 (2001), p. 164.

SUMMARY OF INVENTION

Technical Problem

Although a steel pipe to be used for fuel injection that is produced by the method disclosed in Patent Document 1 has high strength, a fatigue life that is consistent with the strength of the pipe material thereof cannot be obtained. Naturally, the higher the strength of the pipe material is, the higher the pressure that can be applied to the inside of the steel pipe will be. However, in the case of applying a pressure to the inside of a steel pipe, an internal pressure that is a limit (hereafter, referred to as a "critical internal pressure") below which a fracture due to fatigue does not occur on the inner surface of the steel pipe does not depend only on the strength of the pipe material. In other words, even if the strength of the pipe material is increased, a critical internal pressure that is more than expected cannot be obtained. The fatigue life is also shortened because the steel pipe is prone to be damaged by fatigue due to the use under a high internal pressure.

The steel pipes for a fuel injection pipe disclosed in Patent Documents 2 and 3 are characterized by having a long fatigue life and a high level of reliability. However, the critical internal pressure of the steel pipe disclosed in Patent Document 2 is 255 MPa or less, and is 260 to 285 MPa for the steel pipe disclosed in Patent Document 3. In particular, in the automotive industry there is a demand for even higher internal pressures, and there is a desire for the development of a fuel injection pipe which has a tensile strength of 800

MPa or more and a critical internal pressure of more than 270 MPa, and particularly desirably, the development of a fuel injection pipe which has a tensile strength of 900 MPa or more and a critical internal pressure of more than 300 MPa. Note that, although the critical internal pressure generally tends to increase slightly depending on the tensile strength of the fuel injection pipe, it is considered that the critical internal pressure is influenced by various factors, and in particular it is not necessarily easy to stably secure a high critical internal pressure for a high-strength fuel injection pipe of 800 MPa or more.

The steel pipe for a fuel injection pipe disclosed in Patent Document 4 has a tensile strength (TS) of 800 MPa or more, preferably 900 MPa or more, and has high critical internal pressure properties, and therefore the reliability of the steel pipe is very high. However, in recent years, there is a demand for a steel pipe for a fuel injection pipe to have an even higher strength of 1100 MPa or more.

Therefore, the present inventors conducted a study in which the steel pipe for a fuel injection pipe disclosed in Patent Document 4 was adopted as a base, and the strength thereof was made a high strength, and found that the hydrogen embrittlement resistance of the steel pipe markedly decreased. In order to secure higher reliability, it is required to suppress embrittlement caused by hydrogen that penetrates during the production process, even in a case where high strength is imparted.

An objective of the present invention is to solve the above problem, and provide a steel pipe for a fuel injection pipe which has high strength and is also excellent in hydrogen embrittlement resistance, as well as a fuel injection pipe that uses the steel pipe for a fuel injection pipe.

Solution to Problem

The present invention was made to solve the problem described above, and the gist of the present invention is a steel pipe for a fuel injection pipe, and a fuel injection pipe that uses the steel pipe for a fuel injection pipe which are described hereunder.

(1) A steel pipe for a fuel injection pipe, wherein:
a chemical composition of the steel pipe consists of, by mass %:
C: 0.17 to 0.27%,
Si: 0.05 to 0.40%,
Mn: 0.30 to 2.00%,
P: 0.020% or less,
S: 0.0100% or less,
O: 0.0040% or less,
Ca: 0.0010% or less,
Al: 0.005 to 0.060%,
N: 0.0020 to 0.0080%,
Ti: 0.005 to 0.015%,
Nb: 0.015 to 0.045%,
Cr: 0 to 1.00%,
Mo: 0 to 1.00%,
Cu: 0 to 0.50%,
Ni: 0 to 0.50%,
V: 0 to 0.15%, and
the balance: Fe and impurities,
a metal micro-structure at a center portion of a wall thickness of the steel pipe includes tempered martensite, or tempered martensite and tempered bainite, and a total area fraction of tempered martensite and tempered bainite is 95% or more;
a hardness at a center portion of the wall thickness of the steel pipe is within a range of 350 to 460 HV1;
a lattice spacing of a (211) diffraction plane measured by CoKα characteristic X-ray diffraction is 1.1716 Å or less, and a half-value width of the (211) diffraction plane is 1.200° or less; and
a number density of cementite having a diameter of 50 nm or more is 20/μm² or less.

(2) The steel pipe for a fuel injection pipe according to the above (1), wherein the chemical composition of the steel pipe contains one or more kinds of element selected from, by mass %:
Cr: 0.03 to 1.00%,
Mo: 0.03 to 1.00%,
Cu: 0.01 to 0.50%,
Ni: 0.01 to 0.50%, and
V: 0.02 to 0.15%.

(3) A fuel injection pipe that uses the steel pipe for a fuel injection pipe according to the above (1) or (2).

Advantageous Effects of Invention

According to the present invention, it is possible to obtain a steel pipe for a fuel injection pipe which has a tensile strength of 1100 MPa or more, and which is also excellent in hydrogen embrittlement resistance.

BRIEF DESCRIPTION OF DRAWING

FIG. 1 is a view illustrating the shape of a specimen used in a hydrogen charging constant load test.

DESCRIPTION OF EMBODIMENT

As the result of conducting in-depth studies for solving the above problem, the present inventors obtained the following findings.

In order to secure a predetermined strength, it is necessary to make the metal micro-structure substantially a tempered martensite single-phase microstructure or a composite phase microstructure composed of tempered martensite and tempered bainite, and to increase the hardness.

On the other hand, it was found that if the hardness is excessive, the hydrogen embrittlement resistance markedly decreases. Therefore, it is necessary to control the hardness of the steel within a predetermined range.

In addition, upon conducting further study it was found that in some cases hydrogen embrittlement cannot be suppressed simply by reducing the hardness of the steel. This is considered to be because strain and dislocations of the crystal lattice caused by dissolved C absorb hydrogen, which causes the hydrogen embrittlement resistance to deteriorate. As a result of investigations using various kinds of steel material, it was found that excellent hydrogen embrittlement resistance can be secured by reducing lattice strain and dislocations, specifically, by controlling the lattice spacing and half-value width of the (211) diffraction plane to predetermined values or less.

Furthermore, if coarse carbides are present in the steel, the coarse carbides act as originating points and propagation paths of hydrogen cracking. In addition, it becomes difficult to secure fine carbides that trap hydrogen, and the effect of suppressing absorption of hydrogen into lattice strain and dislocations cannot be obtained.

The present invention has been made based on the above findings. The respective requirements of the present invention are described in detail hereunder.

1. Chemical Composition

The reasons for limiting each element are as follows. Note that, the symbol "%" with respect to content in the following description means "mass percent".

C: 0.17 to 0.27%

C is an effective element for increasing the strength of steel inexpensively. To secure a desired tensile strength, it is necessary to make the content of C 0.17% or more. However, if the content of C is more than 0.27%, it will result in a decrease in workability. Therefore, the content of C is set within the range of 0.17 to 0.27%. The content of C is preferably 0.20% or more. Further, the content of C is preferably 0.25% or less, and more preferably is 0.23% or less.

Si: 0.05 to 0.40%

Si is an element that has not only a deoxidizing action but also an action that increases the hardenability and improves the strength of steel. To ensure these effects, it is necessary to set the content of Si of 0.05% or more. However, if the content of Si is more than 0.40%, it will result in a decrease in toughness. Therefore, the content of Si is set within the range of 0.05 to 0.40%. The content of Si is preferably 0.15% or more and is preferably 0.35% or less.

Mn: 0.30 to 2.00%

Mn is an element that not only has a deoxidizing action, but is also an effective element for increasing the hardenability and improving the strength and toughness of steel. However, a sufficient strength cannot be obtained if the content of Mn is less than 0.30%, while on the other hand, if the content of Mn is more than 2.00%, coarsening of MnS occurs and the MnS elongates and expands during hot rolling, and the toughness instead decreases. For this reason, the content of Mn is set within the range of 0.30 to 2.00%. The content of Mn is preferably 0.40% or more, and more preferably is 0.50% or more. Further, the content of Mn is preferably 1.70% or less, and more preferably is 1.50% or less.

P: 0.020% or Less

P is an element that is unavoidably present in steel as an impurity. If the content of P is more than 0.020%, it will result in not only a decrease in hot workability, but will also cause the toughness to markedly decrease due to grain-boundary segregation. Therefore, it is necessary to make the content of P 0.020% or less. Note that, the lower the content of P is, the more desirable it is, and the content of P is preferably made 0.015% or less, and more preferably is made 0.012% or less. However, since excessively decreasing P will result in an increase in the production cost, the lower limit thereof is preferably set to 0.005%.

S: 0.0100% or Less

Similarly to P, S is an element that is unavoidably present in steel as an impurity. If the content of S is more than 0.0100%, S will segregate at grain boundaries, and will also be liable to form sulfide-based inclusions and lead to a decrease in the fatigue strength. Therefore, it is necessary to make the content of S 0.0100% or less. Note that, the lower the content of S is, the more desirable it is, and the content of S is preferably made 0.0050% or less, and more preferably is made 0.0035% or less. However, since excessively decreasing S will result in an increase in the production cost, the lower limit thereof is preferably set to 0.0005%.

O: 0.0040% or Less

O forms coarse oxides, and a decrease in the critical internal pressure is liable to occur due to such coarse oxides. From this viewpoint, it is necessary to make the content of O 0.0040% or less. Note that, the lower the content of O is, the more desirable it is, and the content of O is preferably made 0.0035% or less, more preferably is made 0.0025% or less, and further preferably is made 0.0015% or less. However, since excessively decreasing O will result in an increase in the production cost, the lower limit thereof is preferably set to 0.0005%.

Ca: 0.0010% or Less

Ca has an action that causes silicate-based inclusions (Group C in JIS G 0555) to agglomerate, and if the content of Ca is more than 0.0010%, the critical internal pressure will decrease due to formation of coarse C type inclusions. Therefore, the content of Ca is made 0.0010% or less. The content of Ca is preferably made 0.0007% or less, and more preferably is made 0.0003% or less. Note that, if no Ca treatment at all is performed in a facility relating to steel production and refining over an extended period, Ca contamination of the facility can be eliminated, and thus it is possible to make the content of Ca in steel substantially 0%.

Al: 0.005 to 0.060%

Al is an effective element for performing deoxidation of steel, and is an element that has an action that increases the toughness and workability of steel. To obtain these effects, the content of Al must be 0.005% or more. On the other hand, if the Al content is more than 0.060%, inclusions are liable to form, and in particular in steel containing Ti, the risk that Ti—Al composite inclusions will form will increase. Therefore, the content of Al is set within the range of 0.005 to 0.060%. The content of Al is preferably 0.008% or more, and more preferably is 0.010% or more. Further, the content of Al is preferably 0.050% or less, and more preferably is 0.040% or less. Note that, in the present invention, the term "content of Al" means the content of acid-soluble Al ("sol. Al").

N: 0.0020 to 0.0080%

N is an element that is unavoidably present in steel as an impurity. However, in the present invention, it is necessary to cause N to remain in an amount of 0.0020% or more for the purpose of preventing grains from coarsening by the pinning effect of TiN. On the other hand, if the content of N is more than 0.0080%, the risk that large Ti—Al composite inclusions will form increases. Therefore, the content of N is preferably set within the range of 0.0020 to 0.0080%. The content of N is preferably 0.0025% or more, and more preferably is 0.0027% or more. Further, the content of N is preferably 0.0065% or less, and more preferably is 0.0050% or less.

Ti: 0.005 to 0.015%

Ti is an element that contributes to preventing grains from coarsening by finely precipitating in the form of TiN and the like. To obtain that effect, it is necessary to make the content of Ti 0.005% or more.

In this regard, when an internal pressure fatigue test is conducted using a sample, a fatigue crack is initiated and propagates in the sample from the inner surface which has a high stress as an originating point, and fracture occurs as the fatigue crack reaches the outer surface of the sample. At such time, inclusions are present in some cases at the originating portion and are not present in other cases.

In a case where inclusions are not present at the originating portion, a flat fracture surface mode, called a "facet fracture surface", is recognized there. This is formed by the propagation of a crack, initiated on a per grain basis, over several surrounding grains in a shearing mode called "Mode II". When this facet fracture surface grows to its critical level, the propagation mode thereof changes to an opening mode called "Mode I", resulting in a breakage. The growth of the facet fracture surface depends on the prior-austenite grain size (hereafter, referred to as "prior-γ grain size"), which is a dimension unit of initial crack development, and the growth is promoted when the prior-γ grain size is large. This means that when the prior-γ grain size is coarse, the fatigue strength of the matrix structure decreases even when inclusions do not serve as an originating point.

In a case where the content of Ti was high, composite inclusions (hereinafter, referred to as "Ti—Al composite inclusions") of a form in which a plurality of $Al_2O_3$-based inclusions having diameters of 20 μm or less were cross-linked by film-shaped thin layers containing Ti as a main component were observed through observation of the fracture surface of a steel pipe which was subjected to an internal pressure fatigue test. In particular, if the content of Ti is more than 0.015%, there is a risk that large Ti—Al composite inclusions will form. There is a risk that large Ti—Al composite inclusions will result in a decrease in the breakage life under a condition of a very high internal pressure. Therefore, it is necessary for the content of Ti to be made 0.015% or less.

In order to prevent coarsening of prior-γ grains, the content of Ti is preferably 0.006% or more, and more preferably is 0.007% or more. Further, from the viewpoint of preventing formation of Ti—Al composite inclusions, the content of Ti is preferably 0.013% or less, and more preferably is 0.012% or less.

Nb: 0.015 to 0.045%

Nb finely disperses as carbides or carbo-nitrides in steel, and firmly pins crystal grain boundaries and thus contributes to refining the micro-structure and has an effect that improving the critical internal pressure. Further, the toughness of steel is improved by the fine dispersion of carbides or carbo-nitrides of Nb. For these purposes, it is necessary to contain Nb in an amount of 0.015% or more. On the other hand, if the content of Nb is more than 0.045%, the carbides and carbo-nitrides will coarsen and the toughness will instead decrease. Therefore, the content of Nb is set within the range of 0.015 to 0.045%. The content of Nb is preferably 0.018% or more, and more preferably is 0.020% or more. Further, the content of Nb is preferably 0.040% or less, and more preferably is 0.035% or less.

Cr: 0 to 1.00%

Cr is an element that has an effect of improving the hardenability and wear resistance, and therefore may be contained as necessary. However, if the content of Cr is more than 1.00%, the toughness and cold workability will decrease. Therefore when Cr is to be contained, the content of Cr is set to 1.00% or less. The content of Cr is preferably 0.80% or less. Note that, when it is desired to obtain the aforementioned effect, the content of Cr is preferably set to 0.03% or more, more preferably 0.05% or more, further preferably 0.20% or more, and further preferably 0.30% or more.

Mo: 0 to 1.00%

Mo is an element improves the hardenability and increases the temper softening resistance, and is thus an element that contributes to securing high strength. Therefore Mo may be contained as necessary. However, even if the content of Mo is set to more than 1.00%, the effects of Mo will be saturated, and it will result in an increase in the alloy cost. Therefore, when Mo is to be contained, the content of Mo is set to 1.00% or less. The content of Mo is preferably 0.45% or less. Note that, when it is desired to obtain the aforementioned effects, the content of Mo is preferably set to 0.03% or more, and more preferably 0.08% or more.

Cu: 0 to 0.50%

Cu is an element that has an effect of improving the strength and toughness of steel by increasing the hardenability. Therefore. Cu may be contained as necessary. However, even if the content of Cu is set to more than 0.50%, the effect of Cu will be saturated, and it will result in an increase in the alloy cost. Therefore, when Cu is to be contained, the content of Cu is set to 0.50% or less. The content of Cu is preferably set to 0.40% or less, and more preferably 0.35% or less. Note that, when it is desired to obtain the aforementioned effect, the content of Cu is preferably set to 0.01% or more, more preferably 0.02% or more, and further preferably 0.05% or more.

Ni: 0 to 0.50%

Ni is an element that has an effect of improving the strength and toughness of steel by increasing the hardenability. Therefore, Ni may be contained as necessary. However, even if the content of Ni is set to more than 0.50%, the effect of Ni will be saturated, and it will result in an increase in the alloy cost. Therefore, when Ni is to be contained, the content of Ni is set to 0.50% or less. The content of Ni is preferably set to 0.40% or less, and more preferably 0.35% or less. Note that, when it is desired to obtain the aforementioned effect, the content of Ni is preferably set to 0.01% or more, more preferably 0.02% or more, and further preferably 0.08% or more.

V: 0 to 0.15%

V is an element that precipitates as fine carbides (VC) during tempering to increase temper softening resistance, enabling high-temperature tempering which in turn contributes to increasing the strength and the toughness of steel. For this reason, V may be contained as necessary. However, if the content of V is more than 0.15% it will instead lead to a decrease in toughness. Therefore, when V is to be contained, the content of V is set to 0.15% or less. The content of V is preferably set to 0.12% or less, and more preferably 0.10% or less. Note that, when it is desired to obtain the aforementioned effects, the content of V is preferably set to 0.02% or more, and more preferably 0.04% or more.

The balance in the chemical composition of the steel pipe for a fuel injection pipe of the present invention is Fe and impurities. Here, the term "impurities" refers to components which, during industrial production of the steel, are mixed in from a raw material such as ore or scrap or due to various causes during the production processes, and which are allowed within a range that does not adversely affect the present invention.

2. Metal Micro-Structure

The metal micro-structure at the center portion of the wall thickness of the steel pipe for a fuel injection pipe according to the present invention is composed of substantially a tempered martensitic microstructure or a mixed structure of tempered martensite and tempered bainite. Specifically, the above metal micro-structure includes tempered martensite, or tempered martensite and tempered bainite, and the total area fraction of tempered martensite and tempered bainite is 95% or more.

If a ferrite-pearlite micro-structure is present in the micro-structure, even if breakage at the originating points of inclusions is eliminated, a breakage will occur in a ferritic phase having a low hardness locally that serves as an originating point, and therefore a critical internal pressure that is expected based on the macroscopic hardness and tensile strength cannot be obtained. In addition, with a micro-structure that contains no tempered martensite or a ferrite-pearlite micro-structure, it is difficult to secure a high tensile strength.

Further, as described above, to suppress the occurrence of hydrogen embrittlement due to absorption of hydrogen into lattice strain and dislocations, it is necessary to reduce the lattice strain and dislocations. Specifically, the lattice spacing of the (211) diffraction plane measured by CoKα characteristic X-ray diffraction is to be 1.1716 Å or less, and the half-value width of the (211) diffraction plane is to be 1.200° or less. Measurement is performed using an X-ray diffractometer, and the measurement conditions are a CoKα characteristic X-ray, a tube voltage of 30 kV, and a tube current of 100 mA.

The reason the present inventors focused on the (211) diffraction plane is that when carbon is dissolved, carbon atoms penetrate between (001) planes and widen the lattice spacing thereof, and the (001) plane itself does not become a diffraction plane, and changes in the (001) plane geometrically affect the (211) plane. The lattice spacing d was calculated based on the diffraction angle (angle of peak: 2θ) using the following equation of Bragg.

$$\lambda = 2 \times d \times \sin\theta$$

Where, $\lambda$ is the wavelength of the diffraction X-ray, which is 1.789 Å for the CoKα ray.

Calibration of the diffraction angle is performed by confirming that the diffraction peak location of a specific plane does not deviate from the reference position using an Si standard sheet. Further, with respect to the half-value width, correction is performed by measuring the broadening of the device in advance using $LaB_6$ (lanthanum hexaboride) as a standard sample.

In addition, in order to secure hydrogen embrittlement resistance, it is necessary to disperse fine cementite which acts as a trap site of hydrogen. On the other hand, if the amount of coarse cementite is large, not only does the coarse cementite itself act as an originating point and propagation path of hydrogen cracking, but securing fine cementite also becomes difficult. Therefore, the number density of coarse cementite having a diameter of 50 nm or more is to be $20/\mu m^2$ or less.

In the present invention, the number density of coarse cementite is measured by observation using a transmission electron microscope (TEM). Specifically, a thin film having a thickness of 100 nm is prepared from the center portion of the wall thickness of the steel pipe, and observation is conducted using a TEM at a magnification of ×30,000. Cementite having a diameter of 50 nm or more is then identified. Note that, each grain is approximated to an ellipse to measure its major axis and minor axis, and the average value of the measured values is adopted as the diameter of the cementite. The number density is then determined by dividing the number of coarse cementite particles that were identified by the visual field area.

3. Mechanical Properties

The hardness in a center portion of the wall thickness of the steel pipe for a fuel injection pipe according to the present invention is within the range of 350 to 460 HV1. If the above hardness is less than 350 HV1, sufficient strength and critical internal pressure cannot be obtained. On the other hand, if the hardness is more than 460 HV1, the hydrogen embrittlement resistance markedly decreases. Note that, "HV1" denotes the "hardness symbol" in a case where a Vickers hardness test is performed with a test force of 9.8 N (1 kgf) (see JIS Z 2244:2009).

By the hardness at the center portion of the wall thickness being 350 HV1 or more, a tensile strength of 1100 MPa or more and a critical internal pressure of 350 MPa or more are obtained. By the critical internal pressure being 350 MPa or more, it is possible to secure safety with respect to fracture fatigue. When it is desired to obtain a tensile strength of 1200 MPa or more, the above hardness is preferably 400 HV1 or more.

Note that, in the present invention the term "critical internal pressure" means the maximum internal pressure (MPa) at which no breakage (leak) occurs after $10^7$ cycles of repetitive internal pressure fluctuations that follow a sine wave over time in an internal pressure fatigue test with a minimum internal pressure set at 18 MPa. Specifically, on an S—N diagram in which the ordinate represents the maximum internal pressure and the abscissa represents the number of cycles to breakage, a middle value between the minimum value of the maximum internal pressure at which breakage occurred and the maximum value at which breakage did not occur even after $10^7$ cycles is taken as the critical internal pressure.

4. Dimensions

No particular limitations are set with respect to the dimensions of the steel pipe for a fuel injection pipe according to the present invention. However, a fuel injection pipe typically needs to have a certain amount of capacity in order to reduce internal pressure fluctuation during use. Therefore, it is desirable for the inner diameter of the steel pipe for a fuel injection pipe according to the present invention to be 2.5 mm or more, and more desirably 3.0 mm or more. Further, since it is necessary for a fuel injection pipe to withstand a high internal pressure, it is desirable for the wall thickness of the steel pipe to be 1.5 mm or more, and more desirably 2.0 mm or more. On the other hand, if the outer diameter of the steel pipe is too large, it will be difficult to perform bending work and the like. Therefore, it is desirable for the outer diameter of the steel pipe to be 20 mm or less, and more desirably 10 mm or less.

Furthermore, in order to withstand a high internal pressure, it is desirable that the larger the inner diameter of the steel pipe is, the larger the wall thickness is made in a manner that corresponds with the inner diameter. If the inner diameter of the steel pipe is constant, as the wall thickness increases, the outer diameter of the steel pipe also increases. In other words, in order to withstand a high internal pressure, it is desirable that as the inner diameter of a steel pipe increases, the outer diameter of the steel pipe is also increased. In order to obtain a sufficient critical internal pressure as a steel pipe for a fuel injection pipe, it is desirable that the outer diameter and the inner diameter of the steel pipe satisfy the following formula (i):

$$D/d \geq 1.5 \qquad (i)$$

where, in the above formula (i), D denotes the outer diameter (mm) of the steel pipe for a fuel injection pipe, and d denotes the inner diameter (mm) of the steel pipe for a fuel injection pipe.

Note that, D/d which is the above ratio between the outer diameter and the inner diameter of the steel pipe is more desirably 2.0 or more. On the other hand, although an upper limit of D/d is not particularly set, it is desirably 3.0 or less and more desirably 2.8 or less because bending work will be difficult if the value of D/d is excessively large.

5. Production Method

Although there are no particular limitations with regard to a method for producing the steel pipe for a fuel injection pipe according to the present invention, for example, in the case of producing the steel pipe for a fuel injection pipe from a seamless pipe, the steel pipe can be produced by preparing an ingot in which inclusions are suppressed in advance by a method described hereunder, producing a material pipe from the ingot by a technique such as Mannesmann pipe making, giving desired dimensions and a desired shape to the material pipe by cold rolling, and thereafter performing heat treatment.

In order to suppress the formation of inclusions, it is preferable to adjust the chemical composition as described above as well as to increase the cross-sectional area of a cast piece during casting. This is because, after casting, large inclusions float up until solidification. The cross-sectional area of a cast piece during casting is desirably 200,000 mm$^2$ or more. Furthermore, it is possible to decrease directly nonmetallic inclusions in steel by decreasing the casting speed to cause lightweight nonmetallic inclusions to float up as slag. For example, continuous casting can be carried out at a casting speed within a range of 0.3 to 0.7 m/min.

From the cast piece obtained in such a manner, a billet for pipe-making is prepared by a method such as blooming, for example. Next, for example, the billet is subjected to piercing rolling and elongation rolling in the Mannesmann-mandrel mill pipe-making process, and finished to predetermined hot rolling dimensions by diameter adjusting rolling using a stretch reducing mill or the like. Subsequently, cold drawing is repeated several times to obtain a predetermined cold-finished size. The cold drawing can be performed with ease by performing stress relief annealing before or in the middle of the cold drawing. Further, it is also possible to use another pipe-making process such as a plug mill pipe-making process.

After performing the final cold drawing in such a manner, in order to satisfy intended mechanical properties as a fuel injection pipe, heat treatments of quenching and tempering are performed.

In the quenching, it is preferable to perform heating to a temperature of the $Ac_3$ transformation point+30° C. or more, and rapid cooling. By setting the heating temperature to the $Ac_3$ transformation point+30° C. or more, martensite formation by quenching will be sufficient, and the desired tensile strength can be obtained. Further, in order to reduce the number of coarse cementite particles and to finely disperse the cementite, it is necessary to completely dissolve carbon during heating. If the heating temperature is less than the $Ac_3$ transformation point+30° C., there is a risk that carbon cannot be completely dissolved. On the other hand, the heating temperature is preferably set to 1150° C. or less. This is because if the heating temperature is more than 1150° C., coarsening of γ grains is liable to occur. The heating temperature is more preferably set to 1000° C. or more.

The $Ac_3$ transformation point is calculated in accordance with the following formula that is described in Non-Patent Document 2:

$$Ac_3(° C.)=912-230.5C+31.6Si-20.4Mn-39.8Cu-18.1Ni-14.8Cr+16.8Mo$$

where, each symbol of an element in the above formula represents a content (mass %) of the corresponding element contained in the steel materials, with the relevant element being substituted with zero when the element is not contained.

Although the heating method during quenching is not particularly limited, unless performed in a protective atmosphere, heating at a high temperature for a long time causes a large amount of scale to be generated on the steel pipe surface, leading to a decrease in dimensional accuracy and in surface texture. Therefore, when heating by furnace heating, such as by use of a walking beam furnace, it is preferable to set the holding time to a short time of around 10 to 20 minutes. From the viewpoint of suppressing scale formation, an atmosphere having a low oxygen potential or a non-oxidizing, reducing atmosphere is preferable as the heating atmosphere.

It is preferable to employ a high-frequency induction heating method or a direct resistance heating method as a heating method because heating with short time holding is thereby achieved, enabling the suppression of scale generated on the steel pipe surface to a minimum. In this case, the holding time at the aforementioned heating temperature is preferably set to 1 s or less. Further, in order to completely dissolve carbon during heating, the heating rate is preferably set to a comparatively low rate, and is preferably set within the range of 20 to 80° C./s.

With regard to cooling during quenching, in order to stably and reliably obtain the desired strength, the cooling rate in a temperature range of 500 to 800° C. is preferably set to 50° C./s or more, more preferably 100° C./s or more, and further preferably 125° C./s or more. With regard to the cooling method, a rapid cooling treatment such as water quenching is preferably used.

A steel pipe that has been subjected to rapid cooling to be cooled to normal temperature is hard and brittle in that rapidly cooled state. In addition, there is a risk that the hydrogen embrittlement resistance may deteriorate due to lattice strain and dislocations caused by dissolved C. Therefore, it is preferable to subject the steel pipe to tempering. However, if the temperature during tempering is more than 450° C., the hardness will markedly decrease, and it will be difficult to obtain the desired strength. On the other hand, if the tempering temperature is less than 250° C., the tempering is liable to be insufficient, which may lead to insufficient toughness and workability, which in turn will result in insufficient reduction of lattice strain and dislocations. Therefore, the tempering temperature is preferably set within a range of 250 to 450° C., and more preferably within a range of 300 to 420° C. Whilst the holding time at the tempering temperature is not particularly limited, the holding time is normally within a range of about 10 to 120 minutes. Note that, after tempering, bends may be straightened using a straightener as appropriate.

The steel pipe for a fuel injection pipe of the present invention can be made into a high-pressure fuel injection pipe by, for example, forming connection heads at both end portions thereof.

Hereunder, the present invention is described more specifically by way of examples, although the present invention is not limited to these examples.

EXAMPLES

Eleven kinds of steel starting materials having the chemical components shown in Table 1 were produced. In the continuous casting, the casting speed during casting was set to 0.5 m/min. and the cross-sectional area of the cast piece was set at 200,000 mm$^2$ or more.

TABLE 1

| Steel | Chemical composition (by mass %, balance: Fe and impurities) | | | | | | | | | | | | | | | | $Ac_3$ (° C.) |
|---|---|---|---|---|---|---|---|---|---|---|---|---|---|---|---|---|---|
| | C | Si | Mn | P | S | O | Ca | Al | N | Ti | Nb | Cr | Mo | Cu | Ni | V | |
| A | 0.20 | 0.31 | 1.42 | 0.014 | 0.0030 | 0.0010 | 0.0001 | 0.037 | 0.0032 | 0.010 | 0.031 | 0.06 | 0.18 | 0.02 | 0.02 | 0.06 | 848 |
| B | 0.27 | 0.31 | 1.42 | 0.013 | 0.0028 | 0.0009 | 0.0001 | 0.035 | 0.0036 | 0.011 | 0.030 | 0.05 | 0.20 | 0.02 | 0.02 | 0.06 | 832 |
| C | 0.23 | 0.23 | 1.55 | 0.009 | 0.0015 | 0.0014 | 0.0002 | 0.025 | 0.0028 | 0.013 | 0.034 | — | — | — | — | — | 835 |
| D | 0.21 | 0.28 | 1.39 | 0.010 | 0.0025 | 0.0011 | 0.0002 | 0.022 | 0.0038 | 0.012 | 0.029 | — | 0.24 | — | — | 0.07 | 848 |
| E | 0.20 | 0.31 | 1.42 | 0.014 | 0 0030 | 0.0010 | — | 0.023 | 0.0032 | 0.010 | 0.031 | 0.06 | 0.18 | — | — | 0.06 | 849 |
| F | 0.18 | 0.23 | 1.33 | 0.011 | 0.0015 | 0.0013 | — | 0.024 | 0.0033 | 0.013 | 0.025 | 0.25 | — | — | — | — | 847 |
| G | 0.20 | 0.29 | 1.40 | 0.012 | 0.0030 | 0.0015 | 0.0002 | 0.020 | 0.0046 | 0.011 | 0.030 | — | — | 0.28 | 0.33 | — | 829 |
| H | 0.15 | 0.22 | 0.51 | 0.011 | 0.0012 | 0.0012 | 0.0001 | 0.015 | 0.0030 | 0.008 | 0.022 | 0.76 | 0.30 | — | — | — | 868 |
| I | 0.21 | 0.33 | 1.43 | 0.014 | 0.0040 | 0.0012 | 0.0001 | 0.017 | 0.0044 | 0.020 | 0.035 | 0.05 | 0.18 | — | — | 0.06 | 847 |
| J | 0.21 | 0.26 | 1.40 | 0.013 | 0.0012 | 0.0017 | — | 0.025 | 0.0030 | 0.003 | 0.013 | 0.11 | 0.12 | — | — | 0.05 | 844 |
| K | 0.18 | 0.30 | 1.40 | 0.013 | 0.0060 | 0.0010 | 0.0001 | 0.026 | 0.0045 | 0.007 | — | 0.08 | 0.02 | — | — | 0.08 | 851 |

$Ac_3$ (° C.) = 912 − 230.5 × C + 31.6 × Si − 20.4 × Mn − 39.8 × Cu − 18.1 × Ni − 14.8 × Cr + 16.8 × Mo

A billet for pipe-making was produced from each of the aforementioned steel starting materials, subjected to piercing rolling and elongation rolling by the Mannesmann-mandrel mill pipe-making process, and hot-rolled to have dimensions of an outer diameter of 34 mm and a wall thickness of 4.5 mm by diameter adjusting rolling using a stretch reducing mill. In order to draw each of these hot-finished material pipes, first, the front end of the material pipe was swaged, and a lubricant was applied. Thereafter, cold drawing was performed using a die and a plug, softening annealing was performed as necessary, and the steel pipe diameter was gradually decreased to finish into a steel pipe having an outer diameter of 8.0 mm and an inner diameter of 4.0 mm.

TABLE 2

| Test No. | Steel | Quenching | | | Tempering | | (211) diffraction plane | | Number density of coarse carbide (/μm²) | Vickers hardness (HVI) | Tensile strength (MPa) | Critical internal pressure (MPa) | Hydrogen resistance safety factor | |
|---|---|---|---|---|---|---|---|---|---|---|---|---|---|---|
| | | Temperature (° C.) | Heating rate (° C./s) | Heating method† | Temperature (° C.) | Time (min) | Lattice spacing (Å) | Half-value width (°) | | | | | | |
| 1 | A | 1100 | 50 | (IH)→WQ | 640 | 10 | 1.1702 | 0.887 | Not measured# | 304 | 975 | 320 | ≥7.7 | Comparative example |
| 2 | A | 1100 | 50 | (IH)→WQ | 470 | 10 | 1.1701 | 0.905 | Not measured# | 340 | 1083 | 340 | ≥8.1 | |
| 3 | A | 1100 | 50 | (IH)→WQ | 420 | 10 | 1.1705 | 0.922 | Not measured# | 360 | 1130 | >350 | ≥8.4 | Inventive example |
| 4 | A | 1100 | 50 | (IH)→WQ | 340 | 10 | 1.1710 | 0.947 | 8 | 417 | 1276 | >350 | ≥8.0 | |
| 5 | A | 1100 | 80 | (IH)→WQ | 340 | 10 | 1.1708 | 0.941 | 18 | 412 | 1272 | >350 | ≥8.0 | |
| 6 | A | 1100 | 50 | (IH)→WQ | 150 | 10 | 1.1717 | 1.211 | Not measured# | 492 | 1469 | >350 | 2.0 | Comparative example |
| 7 | A | 1100 | 200 | (IH)→WQ | 340 | 10 | 1.1706 | 0.930 | 24 | 410 | 1265 | >350 | 2.0 | |
| 8 | B | 1100 | 50 | (IH)→WQ | 340 | 10 | 1.1713 | 1.055 | 13 | 433 | 1324 | >350 | ≥7.5 | Inv. ex. |
| 9 | B | 1000 | 50 | (farnace)→WQ | 200 | 10 | 1.1717 | 1.220 | Not measured# | 456 | 1403 | >350 | 2.0 | Comparative example |
| 10 | B | 1100 | 50 | (farnace)→WQ | 150 | 10 | 1.1719 | 1.297 | Not measured# | 555 | 1647 | >350 | 1.8 | |
| 11 | C | 1100 | 50 | (IH)→WQ | 340 | 10 | 1.1709 | 1.120 | Not measured# | 417 | 1296 | >350 | ≥8.0 | Inventive example |
| 12 | D | 1100 | 50 | (IH)→WQ | 340 | 10 | 1.1710 | 1.087 | Not measured# | 422 | 1304 | >350 | ≥9.1 | |
| 13 | E | 1100 | 50 | (IH)→WQ | 340 | 10 | 1.1709 | 1.032 | Not measured# | 403 | 1253 | >350 | ≥9.7 | |
| 14 | F | 1100 | 50 | (IH)→WQ | 340 | 10 | 1.1707 | 0.985 | Not measured# | 395 | 1202 | >350 | ≥8.3 | |
| 15 | G | 1100 | 50 | (IH)→WQ | 340 | 10 | 1.1711 | 0.996 | Not measured# | 409 | 1263 | >350 | ≥9.2 | |

TABLE 2-continued

| | | Quenching | | | Tempering | | (211) diffraction plane | | Number density of coarse carbide (/μm²) | Vickers hardness (HVI) | Tensile strength (MPa) | Critical internal pressure (MPa) | Hydrogen resistance safety factor | |
|---|---|---|---|---|---|---|---|---|---|---|---|---|---|---|
| Test No. | Steel | Temperature (° C.) | Heating rate (° C./s) | Heating method† | Temperature (° C.) | Time (min) | Lattice spacing (Å) | Half-value width (°) | | | | | | |
| 16 | H | 1100 | 50 | (IH)→WQ | 340 | 10 | 1.1704 | 0.955 | Not measured# | 349 | 1069 | 340 | ≥7 | 2 Comparative example |
| 17 | I | 1100 | 50 | (IH)→WQ | 340 | 10 | 1.1709 | 0.998 | Not measured# | 425 | 1310 | 340 | ≥7.7 | |
| 18 | J | 1100 | 50 | (IH)→WQ | 340 | 10 | 1.1710 | 0.903 | Not measured# | 399 | 1236 | 300 | ≥7.6 | |
| 19 | K | 1100 | 50 | (IH)→WQ | 340 | 10 | 1.1705 | 0.899 | Not measured# | 376 | 1158 | 280 | ≥7.6 | |

†(IH)→WQ means rapid cooling after high-frequency heating, and (farnace)→WQ means rapid cooling after holding for 10 min in farnace.
means that TEM observation is not conducted because the number density of coarse carbide is considered to be comparable to those of Test Nos. 4 and 8.

Next, quenching and tempering were performed under the conditions shown in Table 2, and descaling and smoothing processes were performed on the outer and inner surfaces of the steel pipes. At such time, in Test Nos. 1 to 8 and 11 to 19 in Table 2, the quenching was performed under the conditions of high-frequency heating up to 1100° C. at a heating rate shown in Table 2, and rapid cooling (for a holding time of 1 s or less) at a rate of 50° C./s or more, while in Test Nos. 9 and 10, the quenching was performed by holding for 10 min at 1000° C. and 1100° C., respectively, and water cooling at a rate of 50° C./s or more. The tempering was performed under the conditions of holding for 10 min within a range of 150 to 640° C., and thereafter allowing to cool. The specific tempering temperatures are also shown in Table 2.

For each obtained steel pipe, a tensile test was performed using a No. 11 test coupon specified in JIS Z 2241 (2011), to thereby determine the tensile strength. Note that, if the steel pipe has no straight pipe portion having a sufficient length, the tensile test may be conducted using a small specimen having a thin-walled dumbbell shape cut out from the steel pipe, as described in Non-Patent Document 1.

Further, a sample for micro-structure observation was taken from each steel pipe, and a cross section perpendicular to the steel pipe axis direction thereof was subjected to mechanical polishing. After polishing using emery paper and buff, it was confirmed using Nital etchant that the sample had substantially a tempered martensite single-phase microstructure or a mixed structure of tempered martensite and tempered bainite. In other words, in each of the microstructure and the structure, the total area fraction of tempered martensite and tempered bainite was 95% or more.

Further, measurement of the lattice spacing and the half-value width of the (211) diffraction plane was conducted using an X-ray diffractometer. A CoKα characteristic X-ray, a tube voltage of 30 kV, and a tube current of 100 mA were adopted as the measurement conditions. Calibration of the diffraction angle was performed by confirming that the diffraction peak location of a specific plane did not deviate from the reference position using an Si standard sheet, and with regard to the half-value width, correction was performed by measuring the broadening of the device in advance using $LaB_6$ (lanthanum hexaboride) as a standard sample.

In addition, preliminary cementite observation was performed using a scanning electron microscope (SEM). As a result, in Test No. 7, a granular contrast which appeared to be cementite was recognized, and such kind of granular contrast was not recognized in tests other than Test No. 7. Therefore, in addition to Test No. 7, observation using a TEM was performed with respect to Test Nos. 4, 5 and 8 as representatives of the other samples.

Specifically, a thin film having a thickness of 100 nm was prepared from the center portion of the wall thickness of the steel pipes, observation was conducted using a TEM at a magnification of ×30,000, and cementite having a diameter of 50 nm or more was identified. Note that, each grain was approximated to an ellipse to measure its major axis and minor axis, and the average value of the measured values was adopted as the diameter of the cementite. The number density was then determined by dividing the number of coarse cementite particles that were identified by the visual field area.

With respect to Test Nos. 1 to 3, 6, and 9 to 19, although TEM observation was not conducted, because the heating conditions during quenching were the same as in Test Nos. 4 and 8, it is considered that, with regard to the number density of coarse cementite, the values were equal to the range of values of Test Nos. 4 and 8, and were at least lower than the value of Test No. 5 in which the heating rate during quenching was high.

Next, measurement of the Vickers hardness at the center portion of the wall thickness of the steel pipe was performed based on JIS Z 2244 (2009). The test force was set to 9.8 N (1 kgf).

An internal pressure fatigue test was carried out according to the following procedure. First, each steel pipe was cut to have a length of 200 mm, subjected to pipe end processing, and made into an injection pipe specimen for an internal pressure fatigue test. The fatigue test is a test performed by sealing an end face on one side of the sample, and filling the inside of the sample with a hydraulic oil as a pressure medium from an end face on the other side, and repeatedly fluctuating the internal pressure of the filled portion within a range from a maximum internal pressure to a minimum of 18 MPa such that the internal pressure follows a sine wave over time. The frequency of the internal pressure fluctuations was set at 8 Hz. As the result of the internal pressure fatigue test, the maximum internal pressure at which no breakage (leak) occurred even when the number of cycles reached $10^7$ cycles was evaluated as the critical internal pressure.

In addition, in order to evaluate the hydrogen embrittlement resistance, measurement of the diffusible hydrogen content was performed by the following method. First, each steel pipe was cut to have a length of 10 mm and placed in a quadrupole hydrogen analyzer, and thereafter the temperature was raised from normal temperature to 300° C., the amount of released hydrogen was measured, and the measured amount was taken as the diffusible hydrogen content $C_0$.

Next, a specimen having the shape illustrated in FIG. 1 was prepared, and a hydrogen charging constant load test was conducted in which a test load was applied continuously for at longest 200 hours while charging with hydrogen. Note that, the unit of the dimensions shown in FIG. 1 is mm. The hydrogen charging was performed by immersing the specimen in an electrolytic solution, and applying an electric potential as a cathode. A saline solution to which ammonium thiocyanate had been added was used as the electrolytic solution, and the amount of hydrogen that penetrated into the specimen was adjusted by adjusting the concentration and the current density of the solution.

The test load was determined by the following procedure. An elastoplastic FEM analysis in which a stress-strain curve obtained by conducting the tensile test on the steel pipe was adopted as input data was performed on the actual injection pipe, and the maximum stress was clarified. Next, elastoplastic analysis of the specimen was performed, and a load at which the maximum stress generated at a specimen notch portion became the same as the actual injection pipe was clarified, and the relevant load was adopted as the test load.

The specimen was taken out when the specimen ruptured during the hydrogen charging constant load test, or at the time point at which 200 hours elapsed without rupture of the specimen, the diffusible hydrogen content was then measured, and the measured value was adopted as a threshold diffusible hydrogen content $C_{th}$. However, the $C_{th}$ value in a case where the specimen did not rupture was taken to be the measurement value or higher. A value $C_{th}/C_0$ obtained by dividing the threshold diffusible hydrogen content $C_{th}$ by the diffusible hydrogen content $C_0$ is referred to a "hydrogen resistance safety factor", and this value was adopted as an evaluation index. In the present invention, based on past data, it was determined that if the hydrogen resistance safety factor is 2.0 or less, there is a risk of hydrogen brittleness, while if the hydrogen resistance safety factor is more than 2.0, there is no risk of hydrogen brittleness.

These results are also shown in Table 2.

As shown in Table 2, it was found that Test Nos. 3 to 5, 8, and 11 to 15 which satisfied the requirements of the present invention had a high critical internal pressure and excellent hydrogen embrittlement resistance. In contrast, Test Nos. 1, 2, 6, 7, 9, 10, and 16 to 19 were Comparative Examples that did not satisfy one or more of the requirements of the present invention.

Specifically, in Test Nos. 1 and 2, because the tempering temperature was high and the hardness decreased, the result was that the critical internal pressure was also inferior. On the other hand, in Test Nos. 6, 9 and 10, the tempering temperature was low and the lattice strain could not be reduced, and furthermore, in Test Nos. 6 and 10 the hardness was also excessive, and consequently the result was that the hydrogen embrittlement resistance deteriorated. In Test No. 7, because the heating rate during quenching was high, carbon could not be completely dissolved and the number density of coarse carbides was very high, and consequently the result was that the hydrogen embrittlement resistance deteriorated.

In addition, in Test No. 16, the content of C was too low, and as a result the hardness was low and the critical internal pressure was also inferior. In Test No. 17, the content of Ti was too high, in Test No. 18, the content of Ti and the content of Nb were both low, and in Test No. 19, Nb was not contained, and as a result, in any of Test Nos. 17 to 19, the critical internal pressure was inferior.

INDUSTRIAL APPLICABILITY

According to the present invention, it is possible to obtain a steel pipe for a fuel injection pipe having a tensile strength of 1100 MPa or more that is also excellent in hydrogen embrittlement resistance. Therefore, the steel pipe for a fuel injection pipe according to the present invention can be favorably used in particular as a fuel injection pipe for an automobile.

The invention claimed is:

1. A steel pipe for a fuel injection pipe, wherein:
  a chemical composition of the steel pipe consists of, by mass %:
  C: 0.17 to 0.27%,
  Si: 0.05 to 0.40%,
  Mn: 0.30 to 2.00%,
  P: 0.020% or less,
  S: 0.0100% or less,
  O: 0.0040% or less,
  Ca: 0.0010% or less,
  Al: 0.005 to 0.060%,
  N: 0.0020 to 0.0080%,
  Ti: 0.005 to 0.015%,
  Nb: 0.015 to 0.045%,
  Cr: 0 to 1.00%,
  Mo: 0 to 1.00%,
  Cu: 0 to 0.50%,
  Ni: 0 to 0.50%,
  V: 0 to 0.15%, and
  the balance: Fe and impurities,
  a metal micro-structure at a center portion of a wall thickness of the steel pipe includes tempered martensite, or tempered martensite and tempered bainite, and a total area fraction of tempered martensite and tempered bainite is 95% or more;
  a hardness at a center portion of the wall thickness of the steel pipe is within a range of 360 to 460 HV1;
  a lattice spacing of a (211) diffraction plane measured by CoKα characteristic X-ray diffraction is 1.1716 Å or less, and a half-value width of the (211) diffraction plane is 1.200° or less; and
  a number density of cementite having a diameter of 50 nm or more is 20/μm² or less,
  wherein the steel pipe is subjected to tempering at a tempering temperature within a range of 250 to 420° C.

2. The steel pipe for a fuel injection pipe according to claim 1, wherein the chemical composition of the steel pipe contains one or more kinds of element selected from, by mass %:
  Cr: 0.03 to 1.00%,
  Mo: 0.03 to 1.00%,
  Cu: 0.01 to 0.50%,
  Ni: 0.01 to 0.50%, and
  V: 0.02 to 0.15%.

3. A fuel injection pipe that uses the steel pipe for a fuel injection pipe according to claim 1.

4. A fuel injection pipe that uses the steel pipe for a fuel injection pipe according to claim 2.

* * * * *